United States Patent
Lee et al.

(10) Patent No.: US 6,442,674 B1
(45) Date of Patent: Aug. 27, 2002

(54) METHOD AND SYSTEM FOR BYPASSING A FILL BUFFER LOCATED ALONG A FIRST INSTRUCTION PATH

(75) Inventors: Chan Lee; Hitesh Ahuja, both of Portland, OR (US); Robert F. Krick, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/223,297

(22) Filed: Dec. 30, 1998

(51) Int. Cl.[7] .............................................. G06F 9/315
(52) U.S. Cl. ....................................................... 712/205
(58) Field of Search ................................ 712/205–207, 712/214, 215, 237

(56) References Cited

U.S. PATENT DOCUMENTS

| | | | | |
|---|---|---|---|---|
| 5,761,506 A | * | 6/1998 | Angle et al. ................. | 709/102 |
| 5,954,815 A | * | 9/1999 | Joshi ........................... | 712/237 |
| 5,996,065 A | * | 11/1999 | Makineni et al. ........... | 712/218 |
| 6,016,532 A | * | 1/2000 | Lynch et al. ................. | 711/118 |
| 6,018,786 A | * | 1/2000 | Krick et al. .................. | 711/4 |

OTHER PUBLICATIONS

Friendly, et al., "Putting the fill unit to work: dynamic optimizations for trace cache microprocessors", Nov. 1998, IEEE, pp. 173–181.*

* cited by examiner

Primary Examiner—John F. Niebling
Assistant Examiner—Stacy A Whitmore
(74) Attorney, Agent, or Firm—Kenyon & Kenyon

(57) ABSTRACT

A method and system for reducing a latency of microprocessor instructions in transit along an instruction pipeline of a microprocessor by bypassing, at certain times, a fill buffer located between an instruction source and a trace cache unit on the instruction pipeline. The signal path through the fill buffer to the trace cache unit represent a first signal path. In the instruction pipeline, a second signal path is also provided, one which also leads instructions to the trace cache unit, not through the fill buffer, but through a latch provided on the second instruction path. If the latch is enabled, a set of instructions appearing at the input of the fill buffer is transmitted through the latch along the second instruction path and to the trace cache. As a result, the fill buffer is bypassed and a reduced latency for the bypassed instructions is achieved along the instruction pipeline.

12 Claims, 5 Drawing Sheets

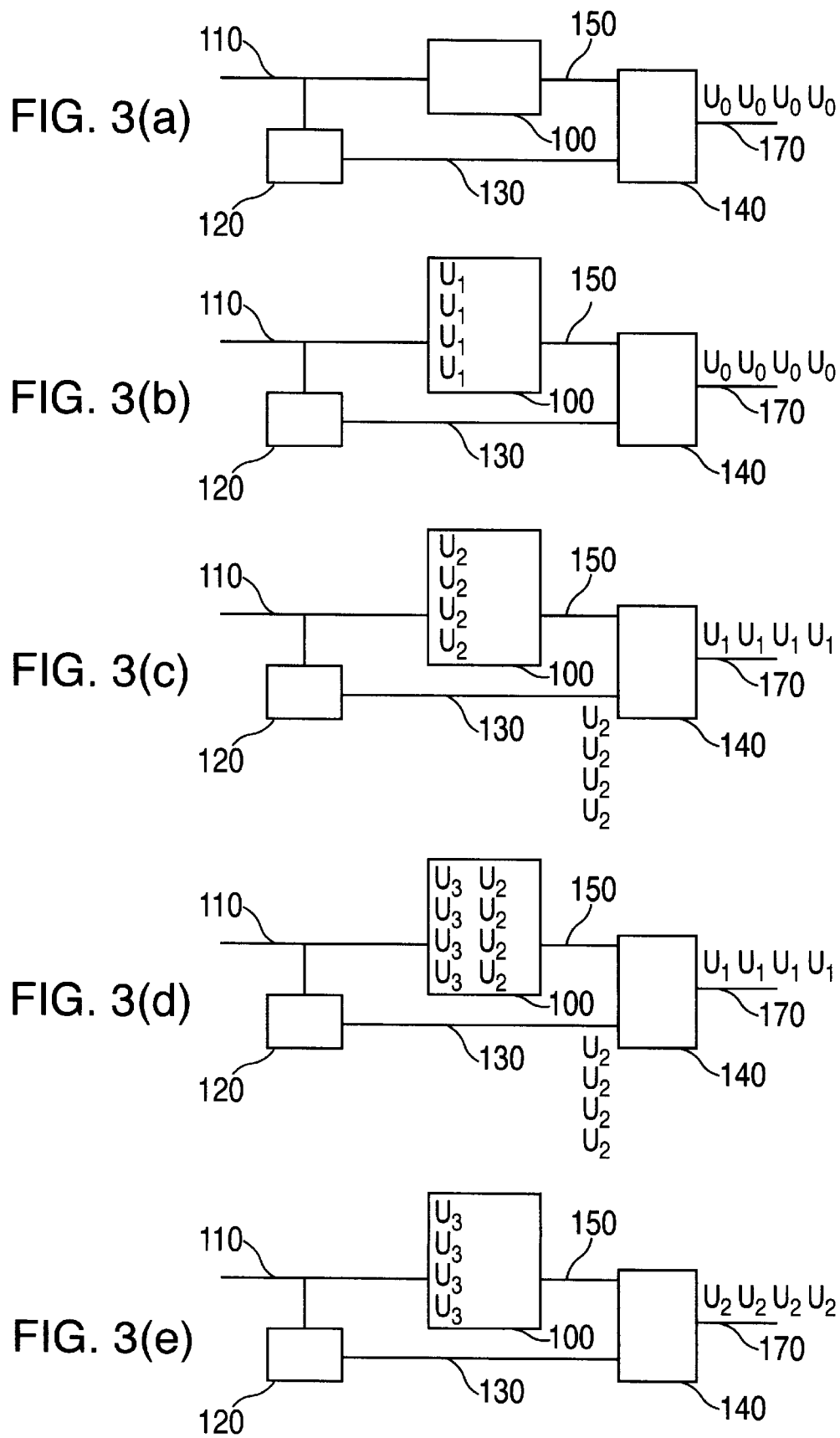

METHOD AND SYSTEM FOR BYPASSING A FILL BUFFER LOCATED ALONG A FIRST INSTRUCTION PATH

FIELD OF THE INVENTION

The present invention is directed to a method and system for bypassing a fill buffer provided on a microprocessor instruction pipeline.

BACKGROUND INFORMATION

Modem microprocessors include instruction pipelines in order to increase program execution speeds. Instruction pipelines typically include a number of units, each unit operating in cooperation with other units in the pipeline. One exemplary pipeline, found in, for example, Intel's Pentium® Pro microprocessor, includes an instruction fetch unit (IFU), an instruction decode unit (ID), an allocation unit (ALLOC), an instruction execution unit (EX) and a write back unit (WB). The instruction fetch unit fetches program instructions, the instruction decode unit translates the instructions into micro-ops (referred to hereinafter as uops), the allocation unit assigns a sequence number to each uop, the execution unit executes the uops, and the write back unit retires the executed uop. Also included in instruction pipelines is a trace cache unit, which acts as a static, high speed RAM that collects uops from the instruction decode unit and provides these uops for execution much more quickly than if such instructions were provided for execution from a dynamic memory. Since trace cache unit exhibits a relatively high hit rate, trace cache unit speeds up the flow of instructions to the execution unit of the instruction pipeline.

Certain instruction pipelines, such as the one for Intel's Pentium® Pro microprocessor, also include a fill buffer (FB) that is located between the instruction decode unit (or some other uop source) and trace cache unit. The reason for placing a buffer between the uop instruction source and the trace cache memory is that the instruction source typically operates according to a clock rate that is higher than the clock rate at which the trace cache operates. Since uops are provided from the instruction source faster than the trace cache can handle them, the fill buffer temporarily stores these uops and provides them to the trace cache unit at a rate that is compatible with the operating rate of the trace cache. Thus, a uop supplied from an instruction source is written into the fill buffer at a clock pulse corresponding to the first clock rate and is read out from the buffer at a clock pulse of the second, slower clock rate. A disadvantage with this temporary storage scheme is that the latency of uops along the instruction pipeline is increased due to the time spent storing the uops in the fill buffer. As a result, the throughput rate of the instruction pipeline is reduced, which slows down the overall instruction execution rate of the microprocessor.

SUMMARY OF THE INVENTION

According to an embodiment of the present invention, the latency of uops being provided from an instruction source to a memory located downstream in an instruction pipeline is reduced.

According to the embodiment of the present invention, an instruction is written into a buffer located along a first instruction path of an instruction pipeline if a first condition is met, and the instruction is transmitted along a second instruction path of the instruction pipeline if a second condition is met. The latency of uops transmitted along the second instruction path is less than the latency of uops transmitted along the first instruction path.

BRIEF DESCRIPTION OF THE DRAWINGS

FIGS. 3(a)–3(f) illustrate the system of FIG. 1 operating in response to the input of sets of uops that include an amount of uops that at the maximum carrying capacity of the instruction pipeline.

DETAILED DESCRIPTION

Figure 1:
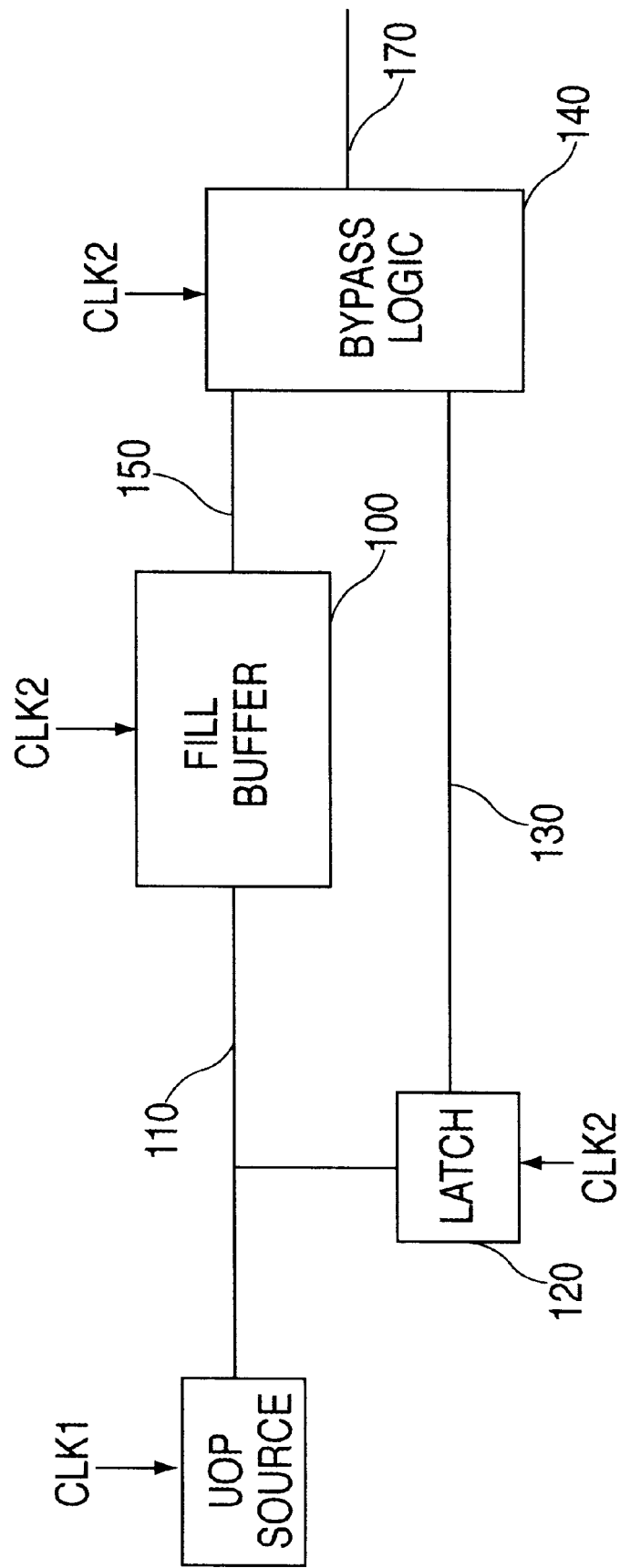
FIG. 1 illustrates a system for bypassing a fill buffer according to an embodiment of the present invention.

FIG. 1 illustrates a portion of a microprocessor instruction pipeline that includes a fill buffer bypass mechanism according to an embodiment of the present invention. Although the principles of the embodiment described herein are presented in connection with the exemplary instruction pipeline illustrated in FIG. 1, this ebodiment is not limited thereto but is instead compatible with a wide variety of other microprocessor architectures as well. In addition, although the bypass operation of the embodiment described herein is described herein in connection with uops, the bypass operation of this embodiment is compatible with other types of instructions.

As explained before, fill buffer 100 receives uops from an instruction decode unit, such as an IXLAT (Instruction Translate) unit or some other source for uops, such as a microsequencer, which may be embodied as a ROM. The input line 110 into fill buffer 100 transmits data according to a clock signal having a period that is intermediate between what is considered by those skilled in the art to be a fast clock and a slow clock speed. Thus, the clock signal according to which the fill buffer input line 110 provides data to the input of fill buffer 100 shall be referred to as a medium clock signal. The output line 150 of fill buffer 100 is coupled to a bypass logic unit 140, which may correspond to any suitable multiplexer. As explained before, the output line 150 of fill buffer 100 operates according to a slow clock speed, which for the sake of simplicity shall be assumed to have a clock-pulse frequency that is half of that of the medium clock signal governing the rate of uop arrival at the input line 110 of fill buffer 100. Of course, the slow clock signal may have clock-pulse frequencies of various other magnitudes, such as one-fourth, one-eighth, one-third, etc. of that of the medium clock signal. Moreover, the slow clock signal need not have a clock-pulse frequency that conforms to a particular ratio with respect to the clock-pulse frequency of the medium clock signal.

The input signal line 110 of fill buffer 100 may convey to fill buffer 100 up to a predetermined number of uops per medium clock boundary (i.e., clock edge) from the instruction decode unit (or some other uop source as previously discussed). In the example corresponding to FIG. 1, for exemplary purposes only, the predetermined amount (also referred to as the maximum carrying capacity) shall be assumed to be four, although various other maximum carrying capacities are compatible with the embodiment of the present invention. Thus, every time a clock pulse is present in the medium clock signal, up to four uops may appear at the input line 110 of fill buffer 100. Depending on the particular microprocessor architecture involved, the input line 110 to fill buffer 100 may support either less than or more than four uops per medium clock pulse. As explained before, the output line 150 of fill buffer may transmit up to six uops that were previously written into fill buffer 100. In the previously proposed instruction pipeline discussed above, the output line of fill buffer 100 would directly convey previously stored uops to a trace cache unit for further processing. In FIG. 1, the output line 150 of fill buffer 100 is coupled to bypass logic unit 140, which is coupled to an output line 170 that leads to a downstream trace cache unit (not shown). As with output line 150, output line 170 also operates according to the slow clock signal. Further, output line 170 also operates in accordance with a maximum carrying capacity constraint, which shall be assumed to be, for exemplary purposes only, six uops per slow clock pulse. The signal path leading from input line 110. through fill buffer 100, and out to bypass logic unit 140 may be referred to as a first instruction path.

Also present in FIG. 1 is slow clock latch 120, which is provided on a bypass line 130. The portion of bypass line 130 that leads into the input of slow clock latch 120 is coupled to input line 110, and the portion of bypass 130 line that leads out of slow clock latch 120 is coupled directly to an input of bypass logic unit 140 that is separate from the input coupled to output line 150 of fill buffer 100. Slow clock latch 120 operates according to the slow clock speed. The signal path leading through slow clock latch 120 to bypass logic unit 140 may be referred to as a second instruction path.

The embodiment of the present invention shall be described in more detail in connection with FIGS. 2(*a*) through 2(*e*). FIG. 2(*e*) illustrates the medium clock signal and the slow clock signal. Moreover, the clock signals of FIGS. 2(*e*) have been delineated according to clock pulses $T_0$ to $T_3$. For each one of these clock pulses (i.e., for every medium clock pulse), up to four uops will arrive at the input of fill buffer 100. Bypass logic unit 140 operates under the governance of certain rules that guide the manner in which these uops are conveyed from input line 110 to output line 170. An example of such rules is discussed below, with the understanding that the embodiment described herein is compatible not only with such rules as discussed herein, but with other rules that are also capable of achieving a bypass operation in a microprocessor architecture. As for the rules that are use in connection with the exemplary embodiment illustrated in FIG. 1, these rules are based on the realization that a proper processing of a group of received uops requires that they be maintained together throughout their transit along the instruction pipeline, at least until they arrive at the trace cache unit. According to one rule, if a set of uops arrive together at a particular medium clock pulse, they are to be outputted together from bypass logic unit 140. For example, if four uops arrive at fill buffer 100 at time $T_0$, the embodiment of the present invention does not allow some of these four uops to be outputted from fill buffer 100 or bypass logic unit 140 at one time and the rest at another time. A group of uops received at one time at fill buffer 100 thus cannot, in a subsequent fill buffer read-out operation or other type of output operation, be broken up into separate pieces for transmission at different times through the fill buffer-bypass mechanism arrangement of the embodiment described herein. As a second rule, which is a corollary to the first rule, if any uop of a group that arrived at fill buffer 100 is to be outputted from fill buffer 100 or bypass logic unit 140, then all of the uops of that group must be outputted at the same time. This grouping of uops is due to the manner in which they are subsequently processed by the units that are downstream of the bypass logic unit. According to another rule, uops progress from input line 110 to output line 170 according to an in-order process, which means that if a first group of uops arrives at the input of fill buffer 100 before a second group of uops, all things else being equal, the first group shall be outputted from bypass logic unit 140 before the second group, provided that combining these two groups into one output group would exceed the maximum carrying capacity of output line 170, which for purposes of this discussion is assumed to be six uops per slow clock pulse.

Turning to FIG. 2(*a*), a first uop arrives at input signal line 110. Each uop discussed herein shall be designated by their particular arrival time at fill buffer 100. Thus, in FIG. 2(*a*) the uop received at time $T_0$ is designated as $U_0$. FIG. 2(*e*) reveals that, in this example, a clock pulse for $T_0$ is present for the medium clock, but not for the slow clock. Thus, uop $U_0$ is merely written into an entry area of fill buffer 100. $U_0$ is not passed through slow clock latch 120 because such a pass through operation can occur only if a uop appears on line 110 when a clock pulse is present in the slow clock signal.

In FIG. 2(*b*), two uops, $U_1$ $U_1$, arrive at input signal line 110. Although they are written into fill buffer 100 just as $U_0$ was written, that particular writing operation is inconsequential because slow clock latch 120, due to the presence of a slow clock pulse, bypasses uops $U_1 U_1$ on bypass line 130 to the output line 170 of bypass logic unit 140. Additionally in this process, the contents of fill buffer 100 which were written into fill buffer 100 during the previous medium clock pulse are read out. In that case, uop $U_0$ is read out and conveyed to output line 170. The output line 170 at time $T_1$ is thus $U_0$ $U_1$ $U_1$. Note that were it not for the bypass mechanism of FIG. 1, at time $T_1$, the only uop that would have appeared at the output line 150 of fill buffer 100 would have been uop $U_0$ because uops $U_1$ $U_1$, which would have been written into fill buffer 100 in clock pulse $T_1$, could not have also been read out from fill buffer 100 in the same clock pulse. The bypass mechanism of the embodiment described herein thus reduces the latency period of uops arriving at input line 110 (i.e., period of time a uop remains in fill buffer 100 before being supplied to the trace cache unit). This desirable result is achieved by combining into one output of bypass logic unit 140 uops produced by normal read out operations of fill buffer 100 and uops conveyed by the bypass mechanism discussed above. In the particular example discussed above, uop $U_0$ is placed on output line 170 by a normal read out operation of fill buffer 100, and uops $U_1$ $U_1$ are placed on output line 170 by the bypass operation of slow clock latch 120 and bypass logic unit 140. Note also that the combination of uop $U_0$ with uops $U_1$ $U_1$ into one output on output line 170 does not violate any of the rules discussed above. Neither the group consisting of uop $U_0$ nor the group consisting of uops $U_1$ $U_1$ was split into subgroups transmitted at different times. As shall be explained below, FIGS. 3(*a*) to 3(*f*) address the situation in which combining received groups of uops into a single output group on line 170 would exceed the maximum carrying capacity of line 170.

In FIG. 2(*c*), a single uop, $U_2$, arrives at input line 110. In time $T_2$, only a medium clock pulse is present. No slow clock signal is present. Therefore, since slow clock latch 120 is not operative during this time, uop $U_2$ is written into fill buffer 100 and not bypassed to bypass logic unit 140. At signal line 170, since output line 170 (along with output line 150 and bypass line 130) operates in accordance with the slow clock signal, the output remains at uops $U_0$ $U_1$ $U_1$, which is what it was set to during the previous medium clock pulse, namely $T_1$. In other words, a particular uop output appearing at output line 170 is to remain valid throughout the entire slow clock period during which the output was set.

Figure 2A:
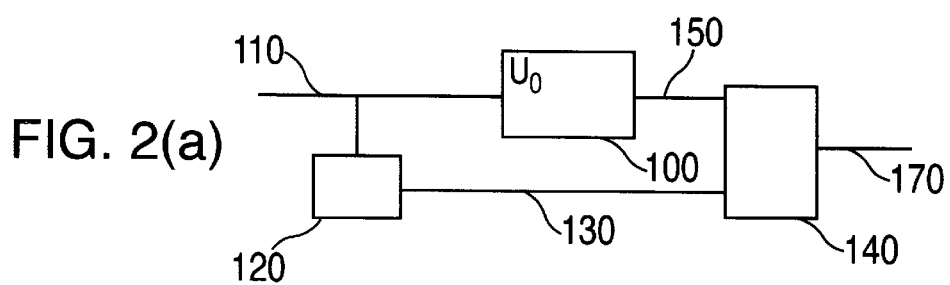
FIGS. 2(a)–2(e) illustrate the system of FIG. 1 operating in response to the input of sets of uops that include an amount of uops that is less than a maximum carrying capacity of the instruction pipeline.
Figure 2B:
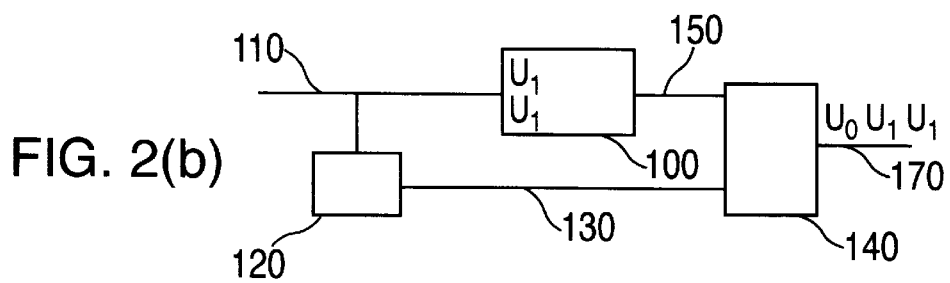
Figure 2C:
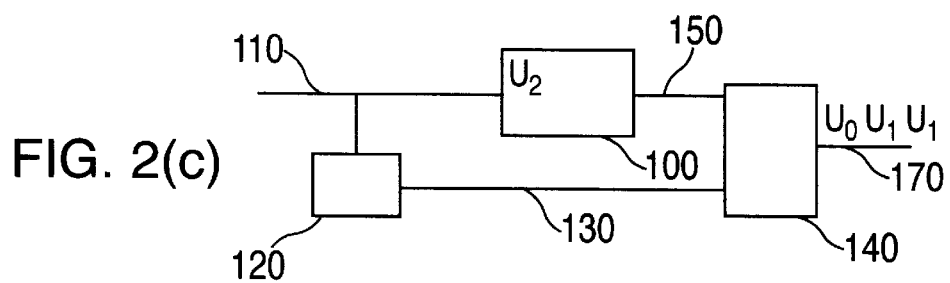
Figure 2D:
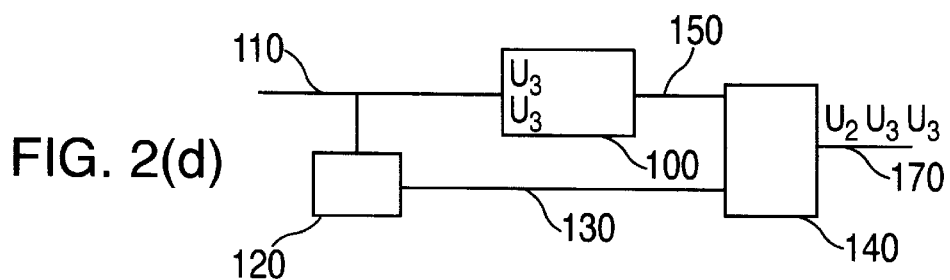
Figure 2E:
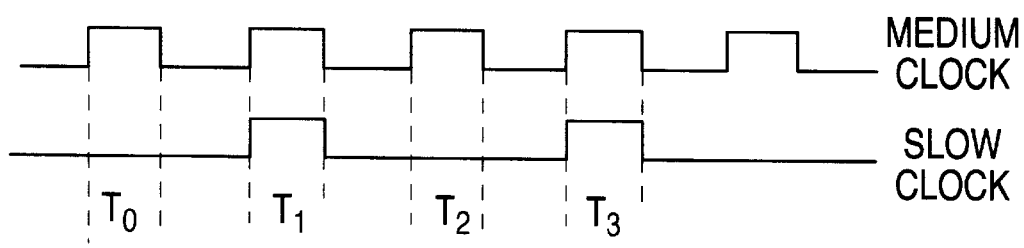

In FIG. 2(d), two uops, $U_3 U_3$, are provided at time $T_3$ to input line 110. As FIG. 2(e) indicates, at time $T_3$, a clock pulse is present not only in the medium clock signal, but also in the slow clock signal. Thus, the presence of a slow clock pulse indicates that slow clock latch 120 is operative for time $T_3$. As a consequence, uops $U_3 U_3$ are bypassed through slow clock latch 120 and bypass logic unit 140 to output line 170. Further, a read out operation of the fill buffer 100 also occurs at time $T_3$, in which uop $U_2$ is read out and provided through bypass logic unit 140 to output line 170. Through this operation, the uops that originally appeared in time $T_2$ (uops $U_0 U_1 U_1$) are sent to the trace cache unit and the uops at output line 170 for time $T_3$ changes to $U_2 U_3 U_3$.

Figure 3F:
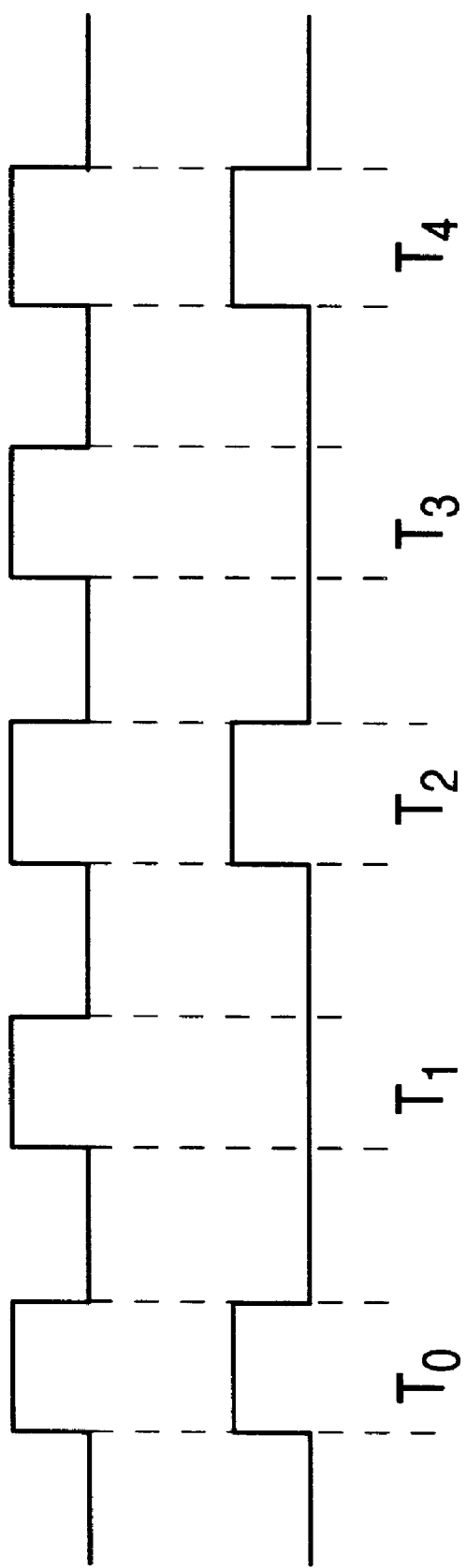

In the examples provided in FIGS. 2(a)–2(d), the amount of uops arriving at input line 110 was always less than the allowed maximum, which as stated above was assumed to be four (in certain other applications this maximum may be 6 uops). In the example presented by FIGS. 3(a) to 3(e), a maximum amount of uops arrives for each medium clock pulse. FIG. 3(f) illustrates a timing diagram of slow and medium clock pulses governing the operation illustrated in FIGS. 3(a) to 3(e). In FIG. 3(a), four uops, $U_0 U_0 U_0 U_0$, arrive at input line 110 at time $T_0$. At this time, a clock pulse is present not only in the medium clock pulse signal, but also in the slow clock pulse signal. Therefore, slow clock latch 120 is active at this time and bypasses uops $U_0 U_0 U_0 U_0$ through bypass logic unit 140 to output line 170.

At time $T_1$, shown in FIG. 3(b), uops $U_1 U_1 U_1 U_1$ arrive at input line 110. Since a slow clock pulse is not present at this time, these uops are written into an entry area of fill buffer 100. The output at line 170 remains $U_0 U_0 U_0 U_0$ for time $T_1$.

In FIG. 3(c), corresponding to time $T_2$, uops $U_2 U_2 U_2 U_2$ arrive at input line 110. Since a slow clock pulse is present at this time, these uops are bypassed to bypass logic unit 140, and, at the same time, uops $U_1 U_1 U_1 U_1$ are read out from fill buffer 100. The joint operation of fill buffer 100 and slow clock latch 120 in this instance creates a conflict with one of the rules of operation discussed above. That is because the output line 170, as explained above, may at most convey only up to six uops per slow clock pulse. Thus, both sets of uops ($U_1 U_1 U_1 U_1$ and $U_2 U_2 U_2 U_2$), each including four uops, cannot be provided to output line 170 at time $T_2$. Moreover, because of the rule discussed above that states that if one uop of a particular group is to be outputted, all of the uops in that group must be outputted, the system of FIG. 1 cannot provide all of the uops $U_1 U_1 U_1 U_1$ and two of the uops $U_2 U^2 U_2 U_2$ to line 170, or vice versa. If one of uops $U_1 U_1 U_1 U_1$ or $U_2 U_2 U_2 U_2$ is to be provided to output line 170, then all of $U_1 U_1 U_1 U_1$ or $U_2 U_2 U_2 U_2$ must be provided to output line 170. Neither of these groups of uops can be broken up.

This conflict did not occur in the example of FIGS. 2(a)–2(d) because, for each slow clock pulse in that example, the corresponding fill buffer read-out operation and bypass operation did not yield an amount of uops that exceeded six and hence, the entirety of each group of uops, whether read out from fill buffer 100 or bypassed through slow clock latch 120, could be combined and provided as one output group of uops at line 170. That is why, for example, the two uops bypassed in FIG. 2(b) could be combined with the single uop read out from the fill buffer 100 to form output $U_0 U_1 U_1$. In that case, a single uop, $U_0$, could be combined at output line 170 with the two uops $U_1$ $U_1$ bypassed at time $T_1$ because to do so did not require taking less than all of the uops of a particular group: $U_0$ was the only uop of its group, and uops $U_1 U_1$ were the only uops in their group. Moreover, the combined total of output uops in that example did not exceed six.

Returning to FIG. 3(c), this Figure presents the conflict in which one set of uops read out from fill buffer 100 and another set of uops bypassed through slow clock latch 120 appear at bypass logic unit 140 and cannot be combined because to do so would violate the rule that if one uop of a particular group is to be provided onto output line 170, then all of that group's uops are to be provided to output line 170 as well. In order to resolve this conflict, bypass logic unit 140 relies on another one of the rules discussed above, namely, the rule which states that between two groups of uops that cannot be combined into one output group, the one to be outputted first from bypass logic unit 140 is the one that arrived first at the input of fill buffer 100. In this case, that group is $U_1 U_1 U_1 U_1$, since it arrived at the input of fill buffer 100 before uops $U_2 U_2 U_2 U_2$. Thus, at time $T_2$, all of the uops $U_1 U_1 U_1 U_1$ are provided onto output line 170 (uops $U_0 U_0 U_0 U_0$ having been provided to the trace cache unit at this time). Moreover, since all uops appearing on signal lines operating under the governance of the slow clock signal are to remain valid for the entire clock period in which they appear, uops $U_2 U_2 U_2 U_2$ remain at the input of bypass logic unit 140 until the next slow clock pulse arrives.

In FIG. 3(d), corresponding to time $T_3$, a clock pulse is present in the medium clock signal, but not in the slow clock signal. Thus, the four uops that appear in this time period, namely, uops $U_3 U_3 U_3 U_3$, are only written into fill buffer 100 and not bypassed through slow clock latch 120 to bypass logic unit 140. At this time, uops $U_2 U_2 U_2 U_2$ remain at the input of bypass logic unit 140 and uops $U_1 U_1 U_1 U_1$ remain at output line 170 because, as explained above, uops that are provided to a particular signal line due to a slow clock boundary are to remain valid at that signal line for the entire slow clock period, but not for any subsequent slow clock period.

In FIG. 3(e), corresponding to time $T_4$, no new uops appear at fill buffer 100. Because of the new slow clock pulse, however, uops $U_2 U_2 U_2 U_2$ are provided from fill buffer 100 to output line 170, and uops $U_1 U_1 U_1 U_1$ are provided to the trace cache unit. Note that uops $U_2 U_2 U_2 U_2$ were not supplied to output line 170 from bypass line 130 because uops $U_2 U_2 U_2 U_2$ could remain valid only for the previous slow clock period and not for any subsequent slow clock period, such as the one corresponding to FIG. 3(e).

The examples discussed above explain how the bypass mechanism of the embodiment of the present invention reduces the latency according to which uops from a decoder unit (or some other uop source) stand idle before being transferred to a trace cache unit of a microprocessor instruction pipeline. Instead of causing each uop to remain temporarily in fill buffer 100 before transferring them to the trace cache unit, the embodiment described herein provides a bypass logic unit 140 that outputs both uops read out from fill buffer 100 and uops that have bypassed the fill buffer 100 through slow clock latch 120, the bypass logic unit 140 producing as a result an output set of uops on output line 170 that in certain instances includes a combination of read-out and bypassed uops. As a result, at least some of the uops received at input line 110 are transferred to the trace cache unit sooner than if all uops intended for the trace cache unit were required to first be written into and then read out from fill buffer 100, which was the case in previously proposed instruction pipelines.

Figure 4:
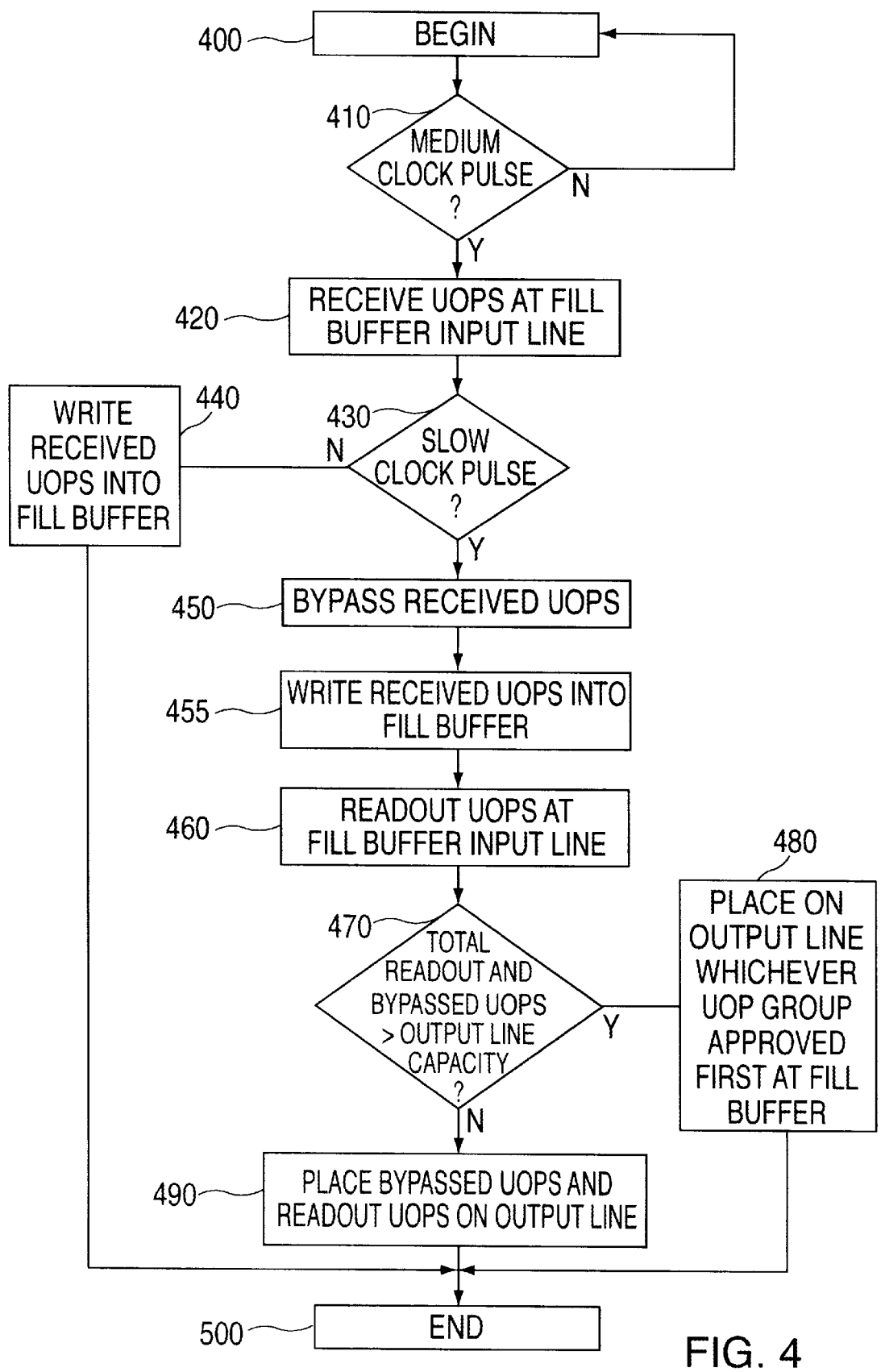
FIG. 4 is a flow diagram showing an operation of the system of FIG. 1 in accordance with the embodiment of the present invention.

FIG. 4 present a flow diagram that represents, in general terms, an operation of the bypass mechanism of the embodiment described herein in conjunction with that of the fill buffer 100. First, it is determined whether a medium clock pulse is present (step 410). If such a medium clock is present, at least one uop is then received at the input line 110 of fill buffer 100 (step 420). The presence of a slow clock pulse is also determined at this point (step 430). If no slow clock pulse is present, then each uop received in step 420 is written into fill buffer 100 (step 440), where each uop remains until it is read out during a subsequent slow clock pulse. If a slow clock pulse is present, then the received uops are bypassed via slow clock latch 120 on bypass line 130 to the input of bypass logic unit 140 (step 450). These bypassed uops are also written into fill buffer 100, but that writing operation is inconsequential because at this time these uops have already been passed through to a point downstream of fill buffer 100; the embodiment described herein ignores these written uops (i.e., those written uops that were also bypassed through latch 120) insofar as they are not subsequently read out from fill buffer 100 during the next slow clock boundary because such a read out operation would unnecessarily duplicate what has already been passed through bypass logic unit 140. As for those uops that were previously written into fill buffer 100 but never bypassed through slow clock latch 120, in response to a slow clock pulse, a read out operation of fill buffer 100 occurs for these uops, placing the read-out uops at the other input of bypass logic unit 140 (step 460). If the number of read-out uops and bypassed uops is less than or equal to the maximum carrying capacity of output line 170 (assumed in the previously discussed examples to be six uops per slow clock pulse) (step 470), then each of the read-out uops and bypassed uops are passed through bypass logic unit 140 to output line 170 (step 490). That is the situation corresponding to FIGS. 2(b) and 2(d) discussed above. If however, the number of read-out uops and bypassed uops is greater then the maximum carrying capacity of output line 170, then, in accordance with the previously discussed rules governing the bypass mechanism operation, whichever group of uops arrived first at the input line 110 of fill buffer 100 is passed through bypass logic unit 140 in its entirety (step 480). The last-to-arrive group of uops remains at the bypass logic unit input for the entire slow clock period, since one of the rules for governing the slow clock signal lines is that signals on such lines remain valid for the entire duration of the current slow clock period, but they do not remain valid for subsequent slow clock periods. This corresponds to the situation in FIG. 3(c), in which the group of uops $U_1$ $U_1$ $U_1$ $U_1$, which were read out from fill buffer 100, were passed through bypass logic unit 140 before the group of uops $U_2$ $U_2$ $U_2$ $U_2$, which were bypassed through slow clock latch 120 in response to the same slow clock pulse that caused the read-out operation of uops $U_1$ $U_1$ $U_1$ $U_1$, because the read-out uops $U_1$ $U_1$ $U_1$ $U_1$ arrived at fill buffer 100 before the bypassed uops $U_2 U_2 U_2$ $U_2$.

By implementing the bypass scheme described herein, microprocessor architectures reduce the latency of instructions that are in transit along instruction pipelines provided with fill buffers. By reducing this latency, numerous advantages may be achieved, such as faster instruction execution and retirement times, improved processor performance, and a more efficient use of the storage space provided in memory units such as fill buffers that are provided along the instruction pipelines.

What is claimed is:

1. A method of bypassing a buffer located along a first instruction path in an instruction pipeline, comprising the steps of:

transmitting at least one instruction through the buffer along the first instruction path if a first condition is met; and transmitting the at least one instruction along a second instruction path if a second condition is met, wherein:
the first condition corresponds to a presence of a clock pulse of a first clock signal and an absence of a clock pulse of a second clock signal, and
the second condition corresponds to a presence of the clock pulse of the second clock signal.

2. The method according to claim 1, wherein a period of the second clock signal is greater than a period of the first clock signal.

3. The method according to claim 1, wherein the first instruction path operates in accordance with the first clock signal, and wherein the second instruction path operates in accordance with the second clock signal.

4. The method according to claim 1, wherein a latency of the first instruction path is greater than a latency of the second instruction path.

5. The method according to claim 1, wherein the step of transmitting the at least one instruction along the second instruction path includes the steps of:

transmitting the at least one instruction through a latch located on the second instruction path to a bypass logic unit located downstream of the buffer in the instruction pipeline, and outputting the at least one instruction from the bypass logic unit to a memory located downstream of the bypass logic unit in the instruction pipeline.

6. The method according to claim 5, wherein the memory includes a trace cache memory.

7. A method of providing at least one instruction from an instruction source to a memory located downstream from the instruction source in an instruction pipeline, comprising the steps of:

receiving the at least one instruction at an input of a buffer located between the instruction source and the memory on a first instruction path of the instruction pipeline;

if a first condition is met, writing the at least one instruction into the buffer;

if a second condition is met, transmitting the at least one instruction along a second instruction path of the instruction pipeline to a bypass logic unit; and transmitting the at least one instruction from the bypass logic unit to the memory, wherein:
the first condition is met when a clock pulse of a first clock signal is present, and
the second condition is met when a clock pulse of a second clock signal is present.

8. A system for bypassing a buffer located in an instruction pipeline, comprising:

a latch having an input coupled to an input line of the buffer; and a bypass logic unit having an input coupled to an output of the buffer and another input coupled to an output of the latch, wherein:
the input line of the buffer operates in accordance with a first clock signal, and
the latch operates in accordance with a second clock signal.

9. The system according to claim 8, wherein a period of the second clock signal is greater than a period of the first clock signal.

10. A method of bypassing a buffer located along a first instruction path in an instruction pipeline, comprising the steps of:

transmitting at least one instruction through the buffer along the first instruction path if a first condition is met; and transmitting the at least one instruction along a second instruction path if a second condition is met, wherein:
the first condition corresponds to a presence of a clock pulse of a first clock signal, and
the second condition corresponds to a presence of a clock pulse of a second clock signal.

11. The method according to claim 10, wherein a period of the second clock signal is greater than a period of the first clock signal.

12. The method according to claim 7, wherein a period of the second clock signal is greater than a period of the first clock signal.

\* \* \* \* \*